US007280551B2

(12) United States Patent
Nagata et al.

(10) Patent No.: US 7,280,551 B2
(45) Date of Patent: Oct. 9, 2007

(54) WIRELESS PACKET COMMUNICATION METHOD AND WIRELESS PACKET COMMUNICATION APPARATUS

(75) Inventors: Kengo Nagata, Yokohama (JP); Tomoaki Kumagai, Yokosuka (JP); Shinya Otsuki, Yokohama (JP); Kazuyoshi Saito, Hachioji (JP); Satoru Aikawa, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 63 days.

(21) Appl. No.: 10/553,107

(22) PCT Filed: Sep. 9, 2004

(86) PCT No.: PCT/JP2004/013483

§ 371 (c)(1),
(2), (4) Date: Oct. 14, 2005

(87) PCT Pub. No.: WO2005/027555

PCT Pub. Date: Mar. 24, 2005

(65) Prior Publication Data

US 2006/0233146 A1 Oct. 19, 2006

(30) Foreign Application Priority Data

Sep. 9, 2003 (JP) ............................. 2003-317100

(51) Int. Cl.
*H04L 12/28* (2006.01)
*H04J 3/16* (2006.01)
(52) U.S. Cl. .................... 370/431; 370/437; 370/443
(58) Field of Classification Search ................ 370/431, 370/445, 342, 328, 329, 254, 352, 314, 321, 370/437, 443, 524
See application file for complete search history.

(56) References Cited

U.S. PATENT DOCUMENTS 4,979,168 A * 12/1990 Courtois et al. ............ 370/349

(Continued)

FOREIGN PATENT DOCUMENTS

JP 07-303090 A 11/1995

(Continued)

OTHER PUBLICATIONS

International Standard ISO/IEC 8802-11 ANSI/IEEE Std 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications.

(Continued)

*Primary Examiner*—Sonny Trinh
(74) *Attorney, Agent, or Firm*—Harness, Dickey & Pierce, P.L.C.

(57) ABSTRACT

In a wireless packet communication method for transmitting a plurality of wireless packets simultaneously by using multiple wireless channels determined to be idle by carrier sense, a wireless channel determined to be idle and MIMO, or the multiple wireless channel and the MIMO, a mandatory channel that is always used for transmission is set. The wireless packets are transmitted by using the wireless channel(s) including the mandatory channel only when the mandatory channel is idle. That is, in case of transmitting a plurality of wireless packets simultaneously, transmission is performed by using the wireless channel(s) including the mandatory channel, and transmission is not performed when the mandatory channel is not idle.

8 Claims, 12 Drawing Sheets

U.S. PATENT DOCUMENTS

| | | | |
|---|---|---|---|
| 6,591,107 B1 * | 7/2003 | Sonetaka | 455/450 |
| 7,158,484 B1 * | 1/2007 | Ahmed et al. | 370/254 |
| 2002/0159431 A1 * | 10/2002 | Moulsley et al. | 370/347 |
| 2006/0087998 A1 * | 4/2006 | Saito et al. | 370/328 |
| 2006/0109813 A1 * | 5/2006 | Saito et al. | 370/329 |
| 2006/0139201 A1 * | 6/2006 | Nagata et al. | 342/1 |
| 2006/0171353 A1 * | 8/2006 | Nagata et al. | 370/329 |
| 2006/0209874 A1 * | 9/2006 | Nagata | 370/445 |
| 2006/0251028 A1 * | 11/2006 | Nagata et al. | 370/338 |
| 2007/0019592 A1 * | 1/2007 | Otsuki | 370/338 |

FOREIGN PATENT DOCUMENTS

| | | |
|---|---|---|
| JP | 2002-198933 A | 7/2002 |
| JP | 2003-259430 A | 9/2003 |

OTHER PUBLICATIONS

IEEE Std 802.11-1997, Information technology—Telecommunications and information exchange between systems—Local and metropolitan area networks—specific requirements—Part 11: Wireless LAN Medium Access Control (MAC) and Physical Layer (PHY) specifications.

Low-powered Data Communication System/Broadband Mobile Access Communication System (CSMA) standard, ARIB STD-T71 version 1.0, Association of Radio Industries and Businesses (with English Translation).

Kurosaki et al., "100Mbit/s SDM-COFDM over MIMO Channel for Broadband Mobile Communications", Technical Report of The Institute of Electronics, Information and Communication Engineers, A P2001-96, RCS2001-135.

International Standard ISO/IEC 8802-11 ANSI/IEEE Std 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications, 1999, Technological background.

IEEE Std 802.11-1997, Information technology—Telecommunications and information exchange between systems—Local and metropolitan area networks—Specific requirements—Part 11: Wireless LAN Medium Access Control (MAC) and Physical Layer (PHY) specifications, 1997, Technological background.

Low-powered Data Communication System/Broadband Mobile Access Communication System (CSMA) standard, ARIB STD-T71 version 1.0, Association of Radio Industries and Businesses, settled in 2000, Technological background 6.2.4.1.1, 6.2.4.2-6.2.4.2.10.

Kurosaki et al., "100Mbit/s SDM-COFDM over MIMO Channel for Broadband Mobile Communications", Technical Report of The Institute of Electronics, Information and Communication Engineers, A P2001-96, RCS2001-135, Oct. 2001, Technological background.

* cited by examiner (1)

(2)

(3)

(1)
WIRELESS PACKET   WIRELESS CHANNEL (2)
WIRELESS PACKET   WIRELESS CHANNEL (1) WIRELESS PACKET   WIRELESS CHANNEL (2) WIRELESS PACKET   WIRELESS CHANNEL (3) WIRELESS PACKET   WIRELESS CHANNEL

WIRELESS PACKET COMMUNICATION METHOD AND WIRELESS PACKET COMMUNICATION APPARATUS

CROSS-REFERENCE TO RELATED APPLICATION

This application is based upon and claims the benefit of priority from Japanese Patent Application No. 2003-317100, filed on Sep. 9, 2003, the entire contents of which are incorporated herein by reference.

TECHNICAL FIELD

The present invention relates to a wireless packet communication method and a wireless packet communication apparatus for simultaneously transmitting a plurality of wireless packets by using multiple wireless channels or Multiple Input Multiple Output (hereinafter, MIMO).

BACKGROUND ART

In a conventional wireless packet communication apparatus, a wireless channel to be used is determined in advance. Prior to transmission of a data packet, the wireless packet communication apparatus performs carrier sense to detect whether or not that wireless channel is idle. Only when that wireless channel is idle, the wireless packet communication apparatus transmits one data packet. This management allows a plurality of stations (hereinafter, STA) to share one wireless channel in a staggered manner ((1) International Standard ISO/IEC 8802-11 ANSI/IEEE Std. 802.11, 1999 edition, Information technology—Telecommunications and information exchange between systems—Local and metropolitan area networks—Specific reguirements—part 11: Wireless LAN Medium Access Control (MAC) and Physical Layer (PHY) specifications: (2) "Low-powered Data Communication System/Broadband Mobile Access Communication System (CSMA) Standard", ARIB STD-T71 version 1.0, Association of Radio Industries and Businesses, settled in 2000).

On the other hand, a wireless packet communication method is known in which, when multiple wireless channels are found idle by carrier sense, a plurality of wireless packets are transmitted simultaneously by using the wireless channels. This method is generally described with reference to FIGS. 13 and 14.

FIG. 13(1) shows a case where two wireless channels are idle for three wireless packets. Two of the three wireless packets are transmitted simultaneously by using the two wireless channels. FIG. 13(2) shows a case where three wireless channels are idle for two wireless packets. All (two) wireless packets are transmitted simultaneously by using the two wireless channels.

FIG. 14 shows a case where a known MIMO technique (Kurosaki et al., "100 Mbit/s SDM-COFDM over MIMO Channel for Broadband Mobile Communications", Technical Reports of the Institute of Electronics, Information and Communication Engineers, A·P 2001-96, RCS2001-135 (2001-10)) is used together. In MIMO, different wireless packets are transmitted from a plurality of antennas at the same time on the same wireless channel. Those wireless packets transmitted at the same time on the same wireless channel are separated from each other by digital signal processing that can deal with a difference between propagation coefficients of the wireless packets received by a plurality of antennas in an opposed STA. The number of MIMOs is determined in accordance with the propagation coefficients and the like.

FIG. 14(1) shows a case where three wireless channels are idle for seven wireless packets when the number of MIMOs of each wireless channel is two. When MIMO is applied to each of the three wireless channels, up to six wireless packets can be transmitted simultaneously. Therefore, six of the above seven wireless packets are transmitted simultaneously by using the three wireless channels.

FIGS. 14(2) and (3) show cases where three wireless channels are idle for four wireless packets when the Number of MIMOs of each wireless channel is two. When MIMO is applied to each of the three wireless channels, up to six wireless packets can be transmitted simultaneously. However, the number of transmission-standby wireless packets is four. Therefore, MIMO is applied to a part of the three wireless channels. For example, one of the wireless channels transmits two wireless packets by using MIMO, while each of the remaining two wireless channels transmits one wireless packet without using MIMO, as shown in FIG. 14(2). Thus, four wireless packets are transmitted simultaneously by using the three wireless channels in total. Alternatively, four wireless packets are transmitted simultaneously on two wireless channels each using MIMO, as show in FIG. 14(3).

In the case where center frequencies of multiple wireless channels used at the same time are close to each other, an effect of leakage power from one wireless channel to a frequency region used by another wireless channel becomes large. In general, in case of transferring a wireless packet, a transmit-side STA transmits the wireless packet and thereafter a receive-side STA transmits an acknowledgment packet (Ack) for the received wireless packet to the transmit-side STA. When the transmit-side STA tries to receive this acknowledgment packet (hereinafter, ACK packet), the effect of leakage power from another wireless channel used for simultaneous transmission becomes a problem.

For example, a case is considered where center frequencies of wireless channels #1 and #2 are close to each other and transmission times of wireless packets transmitted simultaneously from the respective wireless channels are different from each other, as shown in FIG. 15. In this case, the wireless packet transmitted on the wireless channel #1 is shorter. Thus, when an ACK packet (Ack1) for that packet is received, the wireless channel #2 is performing transmission. Therefore, the wireless channel #1 may not receive that ACK packet (Ack1) because of leakage power from the wireless channel #2. In this situation, throughput cannot be improved even if simultaneous transmission is performed using multiple wireless channels at the same time.

In a wireless LAN system, for example, data sizes of data frames input from a network are not constant. Thus, in case of sequentially converting the input data frames into wireless packets for transmission, packet time lengths of the wireless packets are also different. Therefore, even when a plurality of wireless packets are transmitted simultaneously at the same time, as shown in FIG. 15, the transmission time of each wireless packet is different. This increases a possibility of unsuccessful receiving of the ACK packet.

In order to overcome the above problem, there is a known method in which transmission of a plurality of wireless packets is terminated at the same time or substantially at the same time by making equal or equivalent packet time lengths (time required to transmit the wireless packets) of the wireless packets transmitted simultaneously. In this case, a transmit-side STA is not performing transmission at a timing at which ACK packets for the respective wireless packets reach the transmit-side STA. Thus, the transmit-side STA can receive all the ACK packets without being affected by leakage power between wireless channels or the like. Therefore, the throughput can be improved.

However, even if the packet time lengths of the wireless packets transmitted simultaneously are made the same, the effect of leakage power may become a problem. This case is now described with reference to FIG. 16.

At timing t1, wireless channels #1 and #2 of a transmit-side STA are idle, while a wireless channel #3 is busy. Thus, the transmit-side STA transmits wireless packets having the same packet time length by using the idle wireless channels #1 and #2. Therefore, the effect of leakage power can be avoided between the wireless channels #1 and #2. When the wireless channel #3 becomes idle during transmission of those wireless packets (at timing t2), another STA may determine that the wireless channel #3 is idle and may transmit a wireless packet to the above transmit-side STA by using the wireless channel #3. However, the transmit-side STA is transmitting the wireless packets by using the wireless channels #1 and #2 and therefore cannot receive the wireless packet on the wireless channel #3 because of leakage power from the wireless channels #1 and #2. In other words, the STA in transmission cannot receive a wireless packet transmitted on a wireless channel that is adjacent to the wireless channel being in transmission. This problem occurs not only in case of simultaneous transmission using multiple wireless channels but also in a conventional case where wireless packets are transmitted by using one wireless channel and an adjacent wireless channel that is affected by leakage power receives the wireless packets.

It is an object of the present invention to avoid leakage power from affecting an adjacent channel so as to improve throughput by simultaneous transmission.

DISCLOSURE OF THE INVENTION

A first aspect of the invention provides a wireless packet communication method for transmitting a plurality of wireless packets simultaneously by using multiple wireless channels determined to be idle by carrier sense, a single wireless channel determined to be idle and MIMO, or the multiple wireless channels and the MIMO. The wireless packet communication method includes setting a mandatory channel that is always used for transmission and transmitting the wireless packets by using a wireless channel or wireless channels that includes/include the mandatory channel, only when the mandatory channel is idle.

In other words, for transmitting a plurality of wireless packets simultaneously, transmission is performed by using the wireless channel(s) including the mandatory channel. Transmission is not performed when the mandatory channel is not idle. Moreover, wireless packets are always transmitted via wireless channels including the mandatory channel, and when the mandatory channel is busy, transmission is not performed even if there is another wireless channel. In other words, the mandatory channel can be regarded as a wireless channel having the highest priority among wireless channels that have a plurality of priorities.

A second aspect of the invention provides a wireless packet communication method for transmitting a plurality of wireless packets simultaneously by using multiple wireless channels determined to be idle by carrier sense, a single wireless channel determined to be idle and MIMO, or the multiple wireless channels and the MIMO. The wireless packet communication method includes distinguishing an STA A, for which a mandatory channel always used for transmission is set, from an STA B for which no mandatory channel is set. Wireless packets addressed to the STA A are transmitted by using the wireless channel(s) including the mandatory channel, only when the mandatory channel is idle. Wireless packets addressed to the STA B are transmitted by using the idle wireless channel(s).

The STA A has a similar function as that of the first aspect of the invention. The STA B for which no mandatory channel is set, is made transmittable even when the mandatory channel is busy.

A third aspect of the invention is such that the plurality of wireless packets transmitted simultaneously are set to have the same or equivalent packet time length that corresponds to a packet size or a transmission time in the in the first or second aspect of the invention.

A fourth aspect of the invention is such that in the first or second aspect of the invention, wireless packets are simultaneously transmitted selectively using the multiple wireless channels or MIMO in accordance with the number of pieces of data or the number of MIMOs that depends on a channel condition.

A fifth aspect of the invention provides a wireless packet communication apparatus for transmitting a plurality of wireless packets simultaneously by using multiple wireless channels determined to be idle by carrier sense, a wireless channel determined to be idle and MIMO, or the multiple wireless channels and the MIMO. The wireless packet communication apparatus includes a unit setting a mandatory channel that is always used for transmission and transmitting the wireless packets by using the multiple wireless channels or the wireless channel that include/includes the mandatory channel, only when the mandatory channel is idle.

A sixth aspect of the invention provides a wireless packet communication apparatus for transmitting a plurality of wireless packets simultaneously by using multiple wireless channels determined to be idle by carrier sense, a single wireless channel determined to be idle and MIMO, or the multiple wireless channels and the MIMO. The wireless packet communication apparatus includes a unit distinguishing an STA A, for which a mandatory channel that is always used for transmission is set, from an STA B for which no mandatory channel is set, and determining destinations of the wireless packets. In case of wireless packets addressed to the STA A, the unit transmits the wireless packets by using the multiple wireless channels or the wireless channel that include/includes the mandatory channel, only when the mandatory channel is idle. In case of wireless packets addressed to the STA B, the unit transmits the wireless packets by using idle wireless channel or channels.

A seventh aspect of the invention is such that in the fifth or sixth aspect of the invention, the plurality of wireless packets transmitted simultaneously are set to have the same or equivalent packet time length that corresponds to a packet size or a transmission time.

An eighth aspect of the invention is such that in the fifth or sixth aspect of the invention, wireless packets are simultaneously transmitted selectively using the multiple wireless channels or MIMO in accordance with the number of pieces of data or the number of MIMOs that depends on a channel condition.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

BEST MODE FOR CARRYING OUT THE INVENTION

FIRST EMBODIMENT

Figure 1:
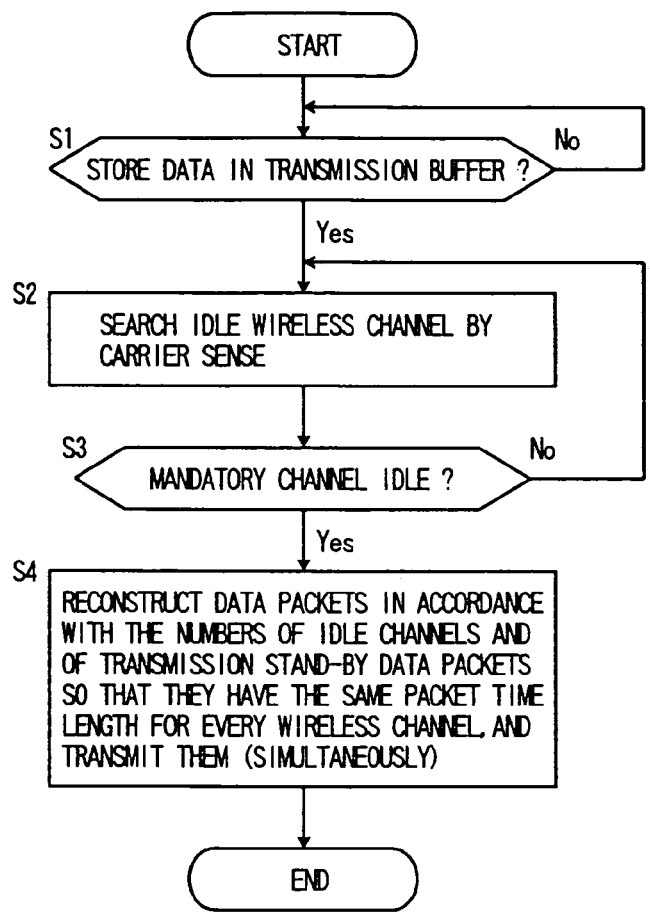
FIG. 1 is a flowchart according to a first embodiment of the present invention.
Figure 2:
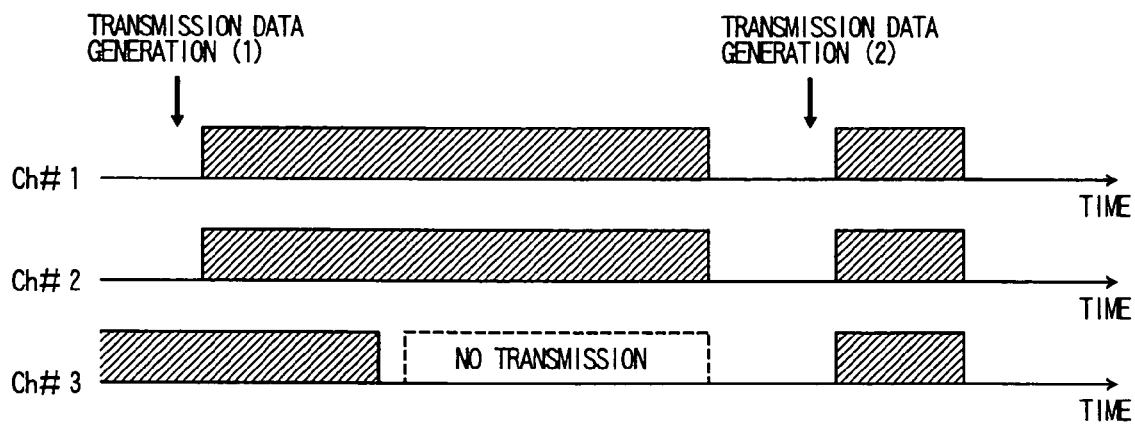
FIG. 2 is a time chart of an exemplary operation in the first embodiment of the present invention.

FIG. 1 is a flowchart of a wireless packet communication method according to the first embodiment of the present invention. FIG. 2 is a time chart of the wireless communication method according to the first embodiment of the present invention. In this embodiment, wireless channels #1, #2, and #3 are provided, and the wireless channel #1 is set as a mandatory channel for every STA. Each STA is regularly notified of the mandatory channel. When the mandatory channel is busy, each STA does not perform transmission even if there is other idle wireless channel. That is, no transmission is performed. It is assumed that the wireless channels #1, #2, and #3 affect each other due to a leakage and that when one of the wireless channels is in transmission, the other channels cannot receive data.

When data is stored in a transmission buffer, an idle wireless channel is searched by carrier sense (S1 and S2). In this example, it is found that the wireless channel #3 is busy at a timing data is generated (1), and the wireless channels #1 and #2 are idle. Then, it is determined whether or not the mandatory channel is idle (S3). When the mandatory channel is busy, a procedure goes back to the search of an idle wireless channel. On the other hand, when the mandatory channel is idle, data packets are reconstructed to data packets having the same packet time length for every wireless channel in accordance with the number of idle channels and the number of transmission stand-by data packets. The reconstructed data packets are transmitted (simultaneously) (S4). In this example, since the wireless channel #1 as the mandatory channel is idle, the wireless packets is simultaneously transmitted by using two wireless channels as the wireless channels #1 and #2.

Figure 3:
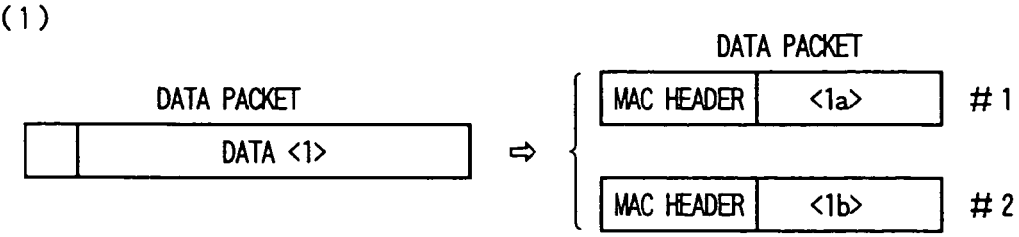
FIG. 3 explains methods for reconstructing a data packet.
Figure 3:
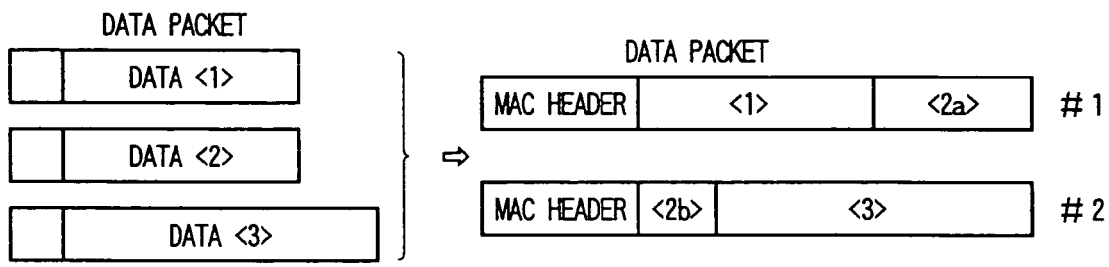
Figure 3:
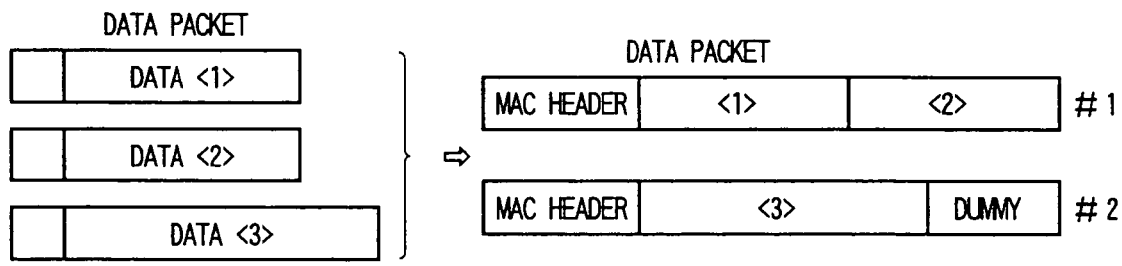

The following three methods are known data packet reconstruction methods. In the case where there is one data packet and two idle channels, for example, two data packets having the same packet time length are generated by fragmenting the data packet, as shown in FIG. 3(1). In the case where there are three data packets and two idle channels, a data packet 2 is divided into two portions and the two portions are connected to data packets 1 and 3, respectively, for example, as shown in FIG. 3(2). In this manner, two data packets having the same packet time length are generated. Alternatively, the two data packets having the same packet time length can be generated by connecting the three data packets into one block and then dividing the block into two. Alternatively, the data packets 1 and 2 may be aggregated to each other and dummy data is added to the data packet 3, as shown in FIG. 3(3), thereby obtaining two data packets having the same packet time length. Moreover, in the case where multiple wireless channels having different transmission rates are used, the packet time lengths of data packets are adjusted to be the same by associating a size ratio of each data packet with a ratio of the transmission rates.

Even when the wireless channel #3 becomes idle, another STA does not perform transmission because the wireless channel #1 set as the mandatory channel is busy. On the other hand, at a timing data is generated (2), all the wireless channels including the wireless channel #1 set as the mandatory channel are idle. Therefore, each STA becomes transmittable. For example, in the case where an STA transmits the wireless packets at the timing data is generated (1), another STA transmits a wireless packet to the STA having transmitted at the timing data is generated (2).

SECOND EMBODIMENT

Figure 4:
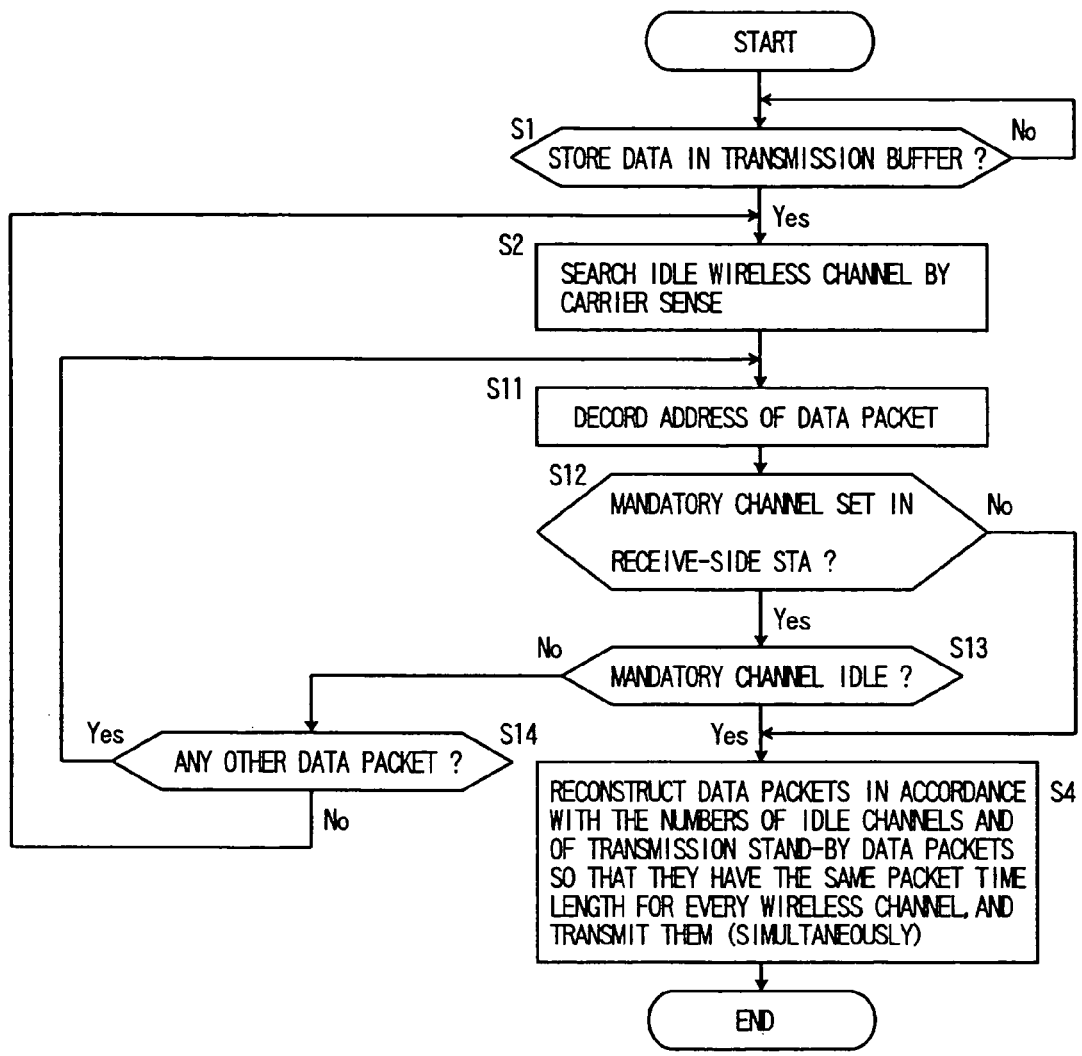
FIG. 4 is a flowchart according to a second embodiment of the present invention.
Figure 5:
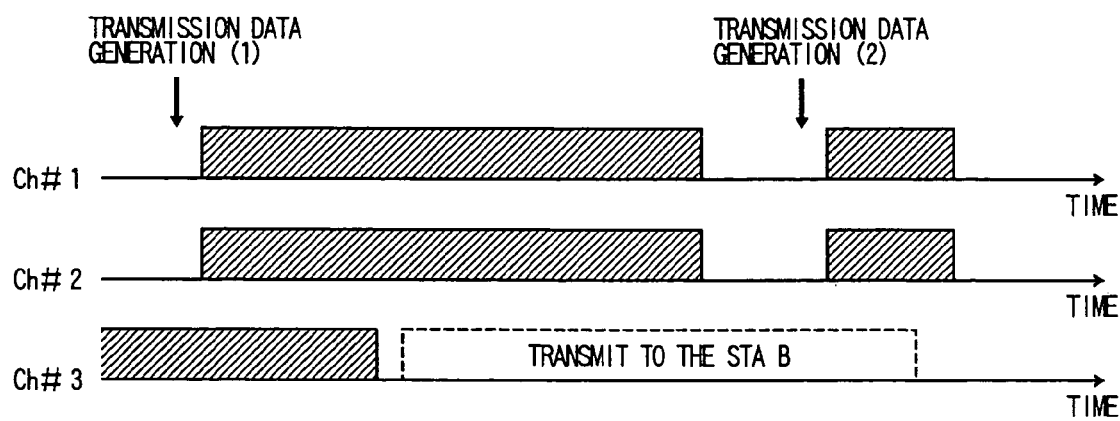
FIG. 5 is a time chart of an exemplary operation in the second embodiment of the present invention.

FIG. 4 is a flowchart of a wireless packet communication method according to the second embodiment of the present invention. FIG. 5 is a time chart of that wireless packet communication method. In this embodiment, there are an STA A for which a mandatory channel is set and an STA B for which no mandatory channel is set. There is no specific limitation to transmission to the STA B, while transmission to the STA A is allowed only when the mandatory channel is idle, and is not performed when the mandatory channel is busy even if another wireless channel is idle. Please note that in the first embodiment a mandatory channel is set for every STA so that packet transmission is always performed via wireless channels including the mandatory channel without an address of a wireless packet being considered.

First, when data is stored in a transmission buffer, an idle wireless channel is searched by carrier sense (S1 and S2). In this example, it is found that at a timing data is generated (1), a wireless channel #3 is busy and wireless channels #1 and #2 are idle. Then, an address of one data packet stored in the transmission buffer is decoded (S11), and it is determined whether or not any mandatory channel is set for an STA that is the decoded address (S12). When a mandatory channel is set for the receive-side STA, it is determined whether or not that mandatory channel is idle (S13). When that mandatory channel is idle, transmission stand-by data packets are reconstructed to have the same packet time length for every wireless channel in accordance with the number of idle channels and the number of the transmission stand-by data packets. The reconstructed data packets are transmitted (simultaneously) (S4). In this example, for wireless packets addressed to the STA A, simultaneous transmission is performed using two wireless channels as the wireless channels #1 and #2 because the wireless channel #1 set as the mandatory channel is idle.

On the other hand, when no mandatory channel is set for the receive-side STA in S12, the state of the mandatory channel need not be considered so that the transmission stand-by data packets are reconstructed to have the same packet time length for every wireless channel in accordance with the number of idle channels and the number of the transmission stand-by data packets. The reconstructed data packets are transmitted (simultaneously) (S4). Moreover, when the mandatory channel is not idle in S13, the wireless packet cannot be transmitted to the STA A for which the mandatory channel is set. Therefore, it is then determined whether or not there is another data packet in the transmission buffer (S14). With a presence of a data packet therein, a procedure returns to decoding of an address of the data packet in S11. With no data packet, an idle channel is searched in S2.

In this example, when the wireless channel #3 becomes idle, transmission of a wireless packet to the STA B in which no mandatory channel is set using the wireless channel #3 becomes possible. On the other hand, transmission of a wireless packet to the STA A using the wireless channel #3 is not performed because the wireless channel #1 is busy, and has to wait until the wireless channel #1 becomes idle.

At a timing data is generated (2), the wireless channels #1 and #2 are idle. Therefore, wireless packets addressed to the STA A for which the mandatory channel is set and to the STA B for which no mandatory channel is set can be transmitted by using the wireless channels #1 and #2.

THIRD EMBODIMENT

Figure 6:
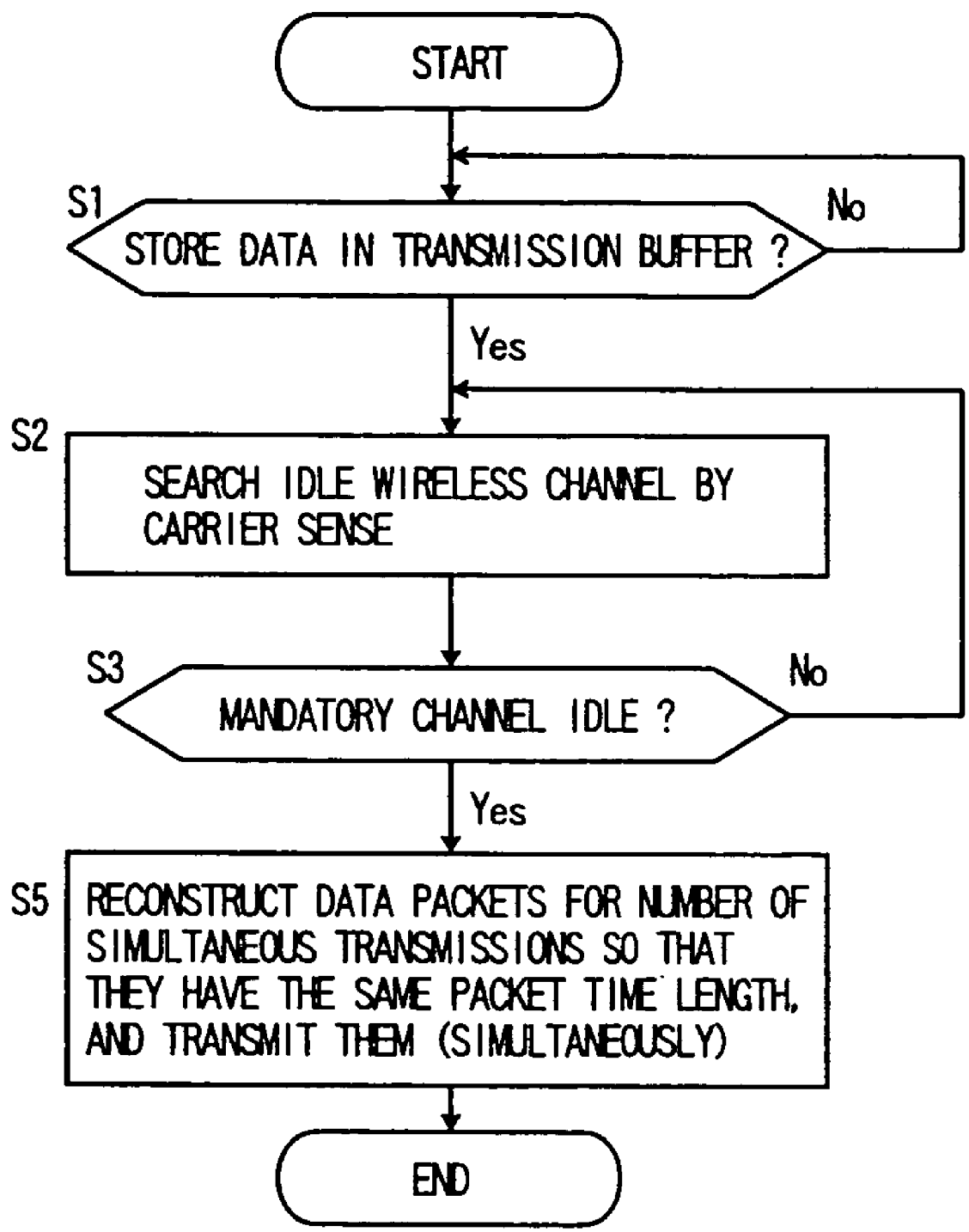
FIG. 6 is a flowchart according to a third embodiment of the present invention.

FIG. 6 is a flowchart of a wireless packet communication method according to the third embodiment of the present invention. This embodiment has a feature in using MIMO additionally for simultaneous transmission of wireless packets in the first embodiment as well as in reconstructing wireless packets in S4 in the first embodiment such that reconstructed wireless packets have the same packet time length for the number of simultaneous transmissions that corresponds to a total number of MIMOs of idle channels (S5). Except for the above, this embodiment is the same as the first embodiment.

FOURTH EMBODIMENT

Figure 7:
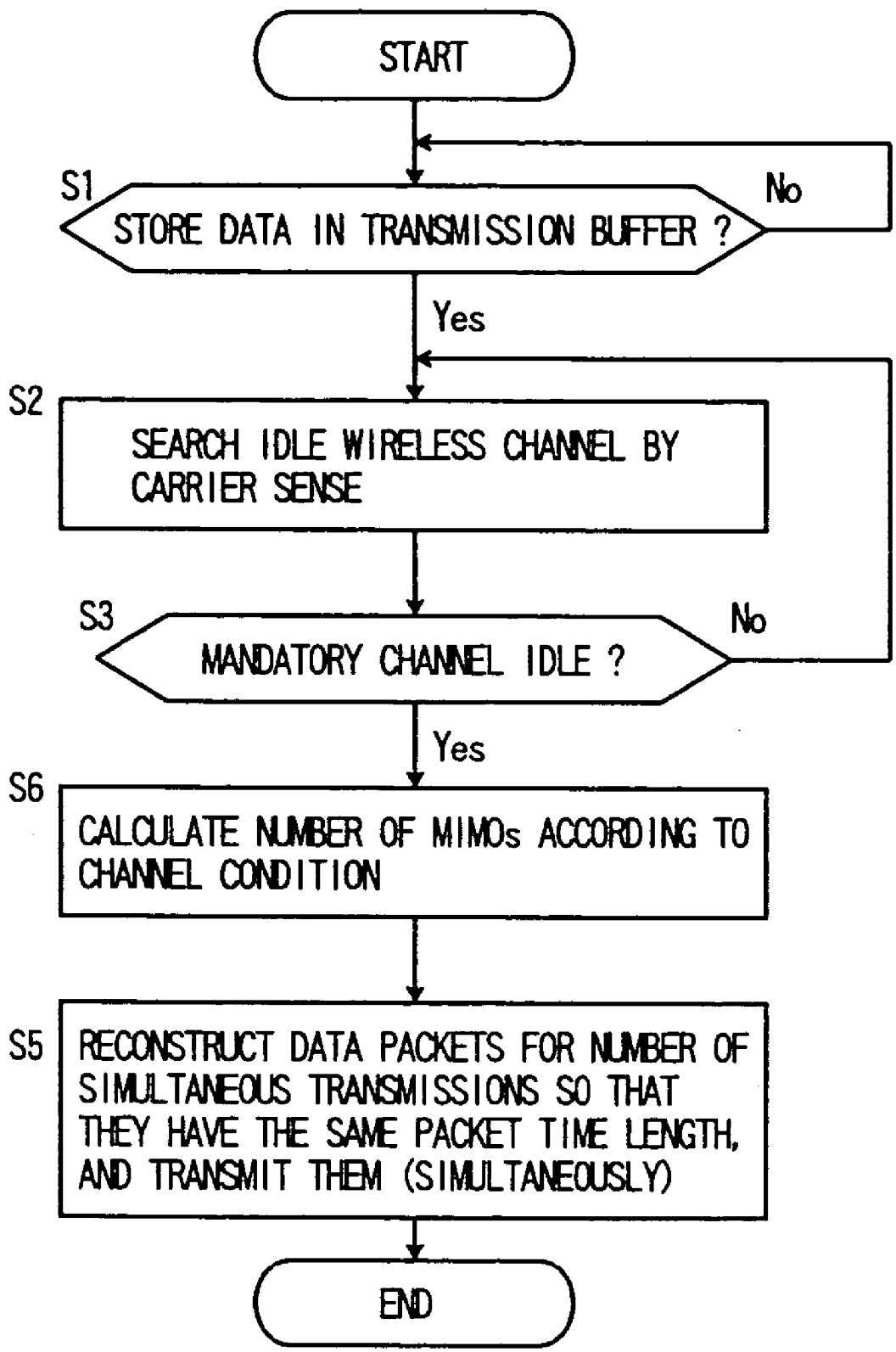
FIG. 7 is a flowchart according to a fourth embodiment of the present invention.

FIG. 7 is a flowchart of a wireless packet communication method according to the fourth embodiment of the present invention. This embodiment has the following feature. In case of applying MIMO to simultaneous transmission of wireless packets, antenna correlation is obtained from propagation coefficients prior to reconstruction of wireless packets to wireless packets having the same packet time length for the number of simultaneous transmissions that corresponds to a total number of MIMOs of idle channels in S5 in the third embodiment. Then, the number of MIMOs that that can be multiplexed in one channel is obtained by using a predetermined threshold value (S6). Except for the above, this embodiment is the same as the third embodiment.

FIFTH EMBODIMENT

Figure 8:
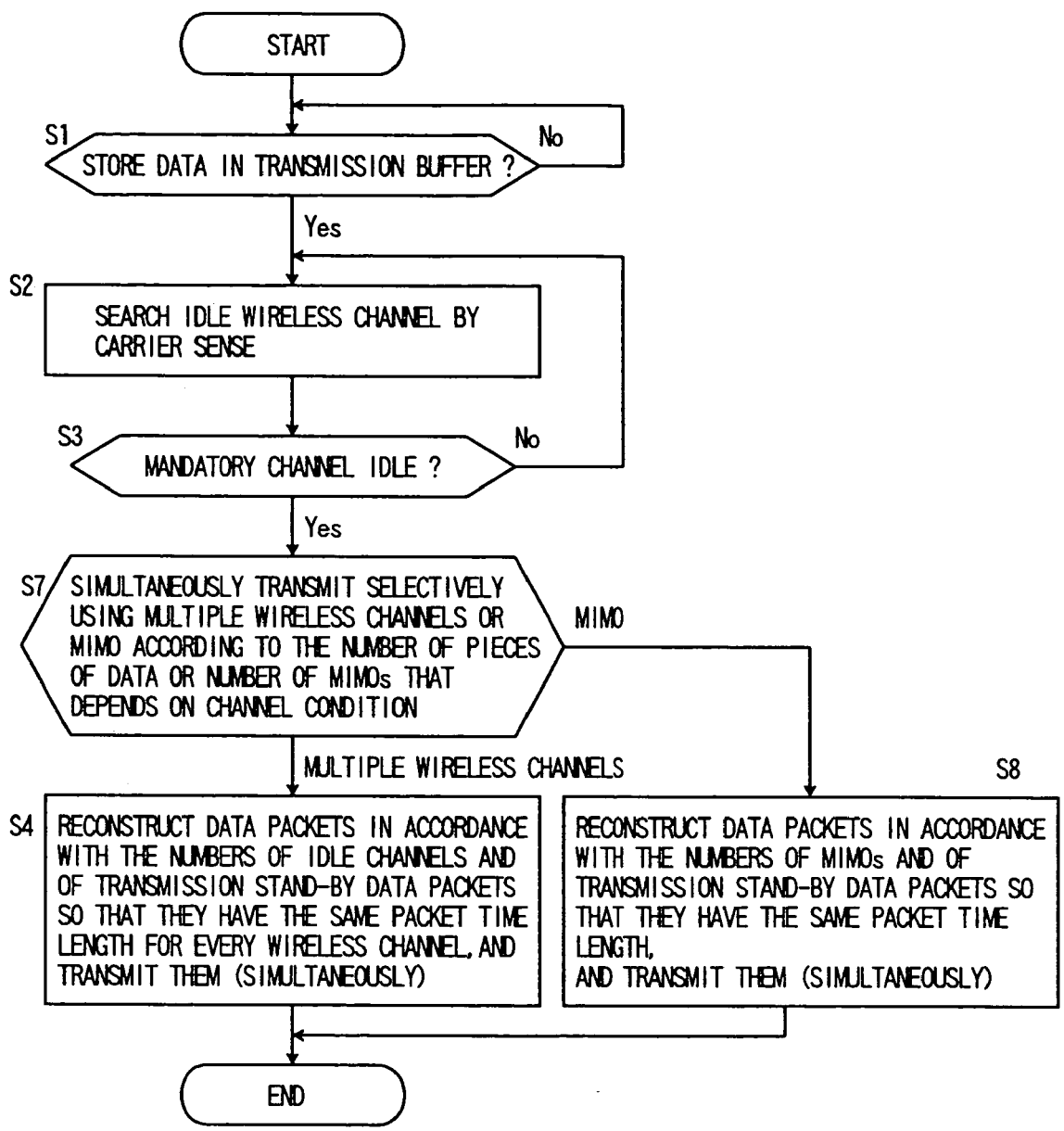
FIG. 8 is a flowchart according to a fifth embodiment of the present invention.

FIG. 8 is a flowchart of a wireless packet communication method according to the fifth embodiment of the present invention. This embodiment has a feature that simultaneous transmission using multiple wireless channels as described in the first embodiment or simultaneous transmission using MIMO as described in the third embodiment is selected in accordance with the number of pieces of data stored in the transmission buffer or the number of MIMOs as described in the fourth embodiment that depends on a channel condition (S7). In accordance with this selection, wireless packets are reconstructed to have the same packet time length for the number of idle channels or the Number of MIMOs. The reconstructed packets are transmitted simultaneously (S4 and S8). Except for the above, this embodiment is the same as the first embodiment.

SIXTH EMBODIMENT

Figure 9:
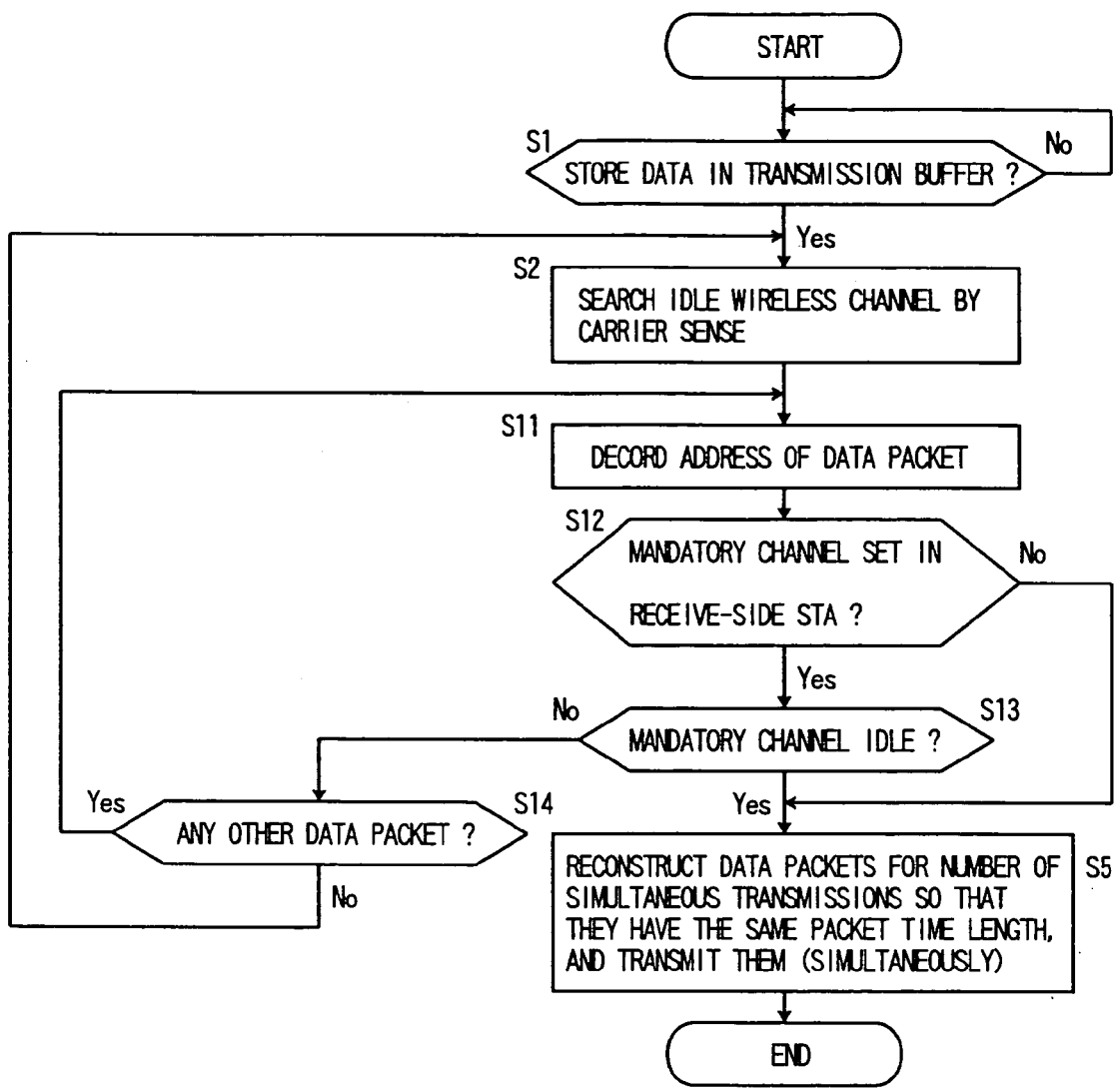
FIG. 9 is a flowchart according to a sixth embodiment of the present invention.

FIG. 9 is a flowchart of a wireless packet communication method according to the sixth embodiment of the present invention. This embodiment has a feature that MIMO is applied to simultaneous transmission of wireless packets in the second embodiment. More specifically, wireless packets in S4 in the second embodiment is reconstructed in such a manner that reconstructed wireless packets have the same packet time length for the number of simultaneous transmissions that corresponds to a total number of MIMOs of idle channels (S5). Except for the above, this embodiment is the same as the second embodiment.

SEVENTH EMBODIMENT

Figure 10:
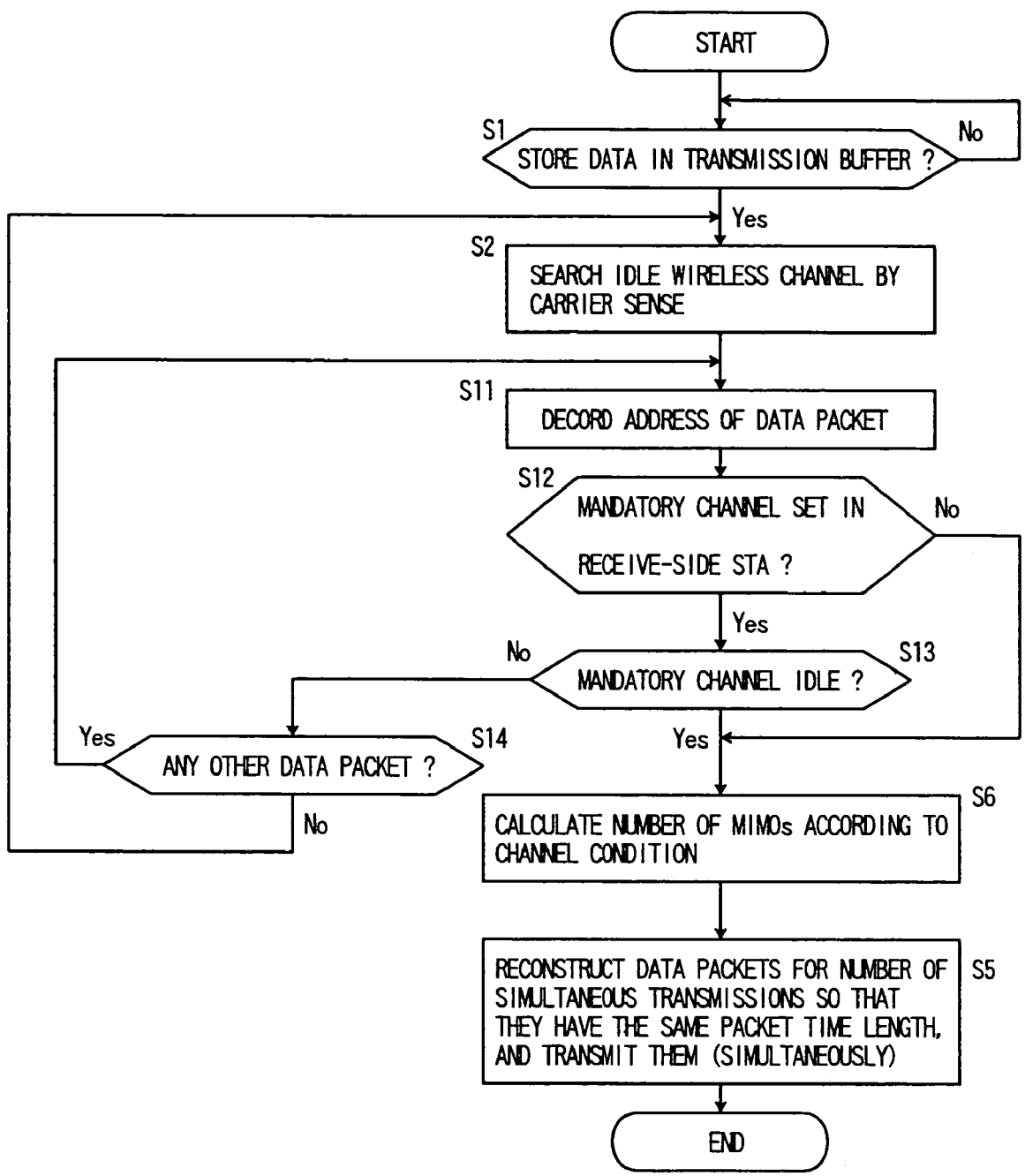
FIG. 10 is a flowchart according to a seventh embodiment of the present invention.

FIG. 10 is a flowchart of a wireless packet communication method according to the seventh embodiment of the present invention. This embodiment has the following feature. In case of applying MIMO to simultaneous transmission of wireless packets, antenna correlation is obtained from propagation coefficients prior to reconstruction of wireless packets to wireless packets having the same packet time length for the number of simultaneous transmissions that corresponds to a total number of MIMOs of idle channels in S5 in the sixth embodiment. Then, the number of MIMOs that can be multiplexed in one channel is obtained by using a predetermined threshold value (S6). Except for the above, this embodiment is the same as the sixth embodiment.

EIGTHH EMBODIMENT

Figure 11:
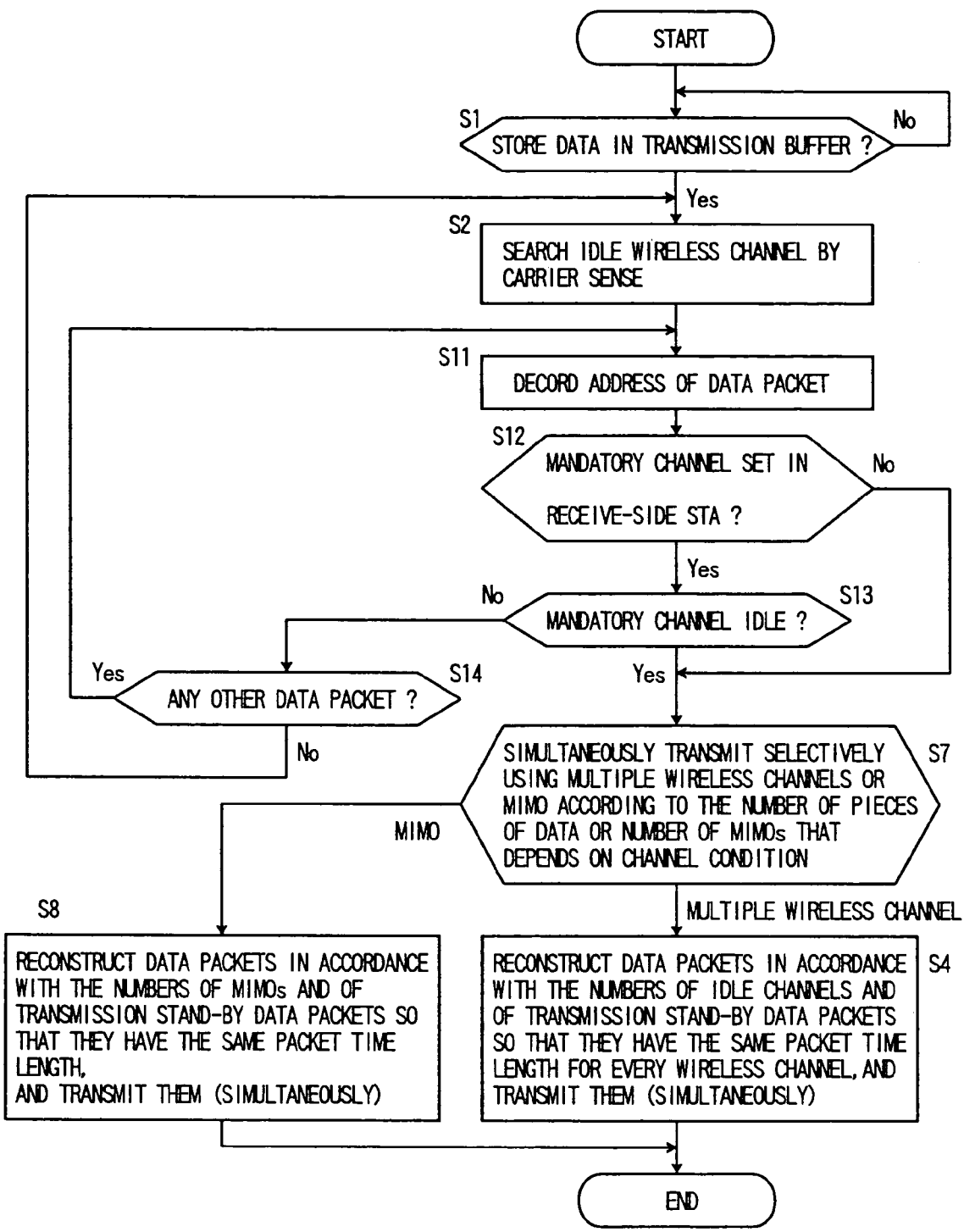
FIG. 11 is a flowchart according to an eighth embodiment of the present invention.

FIG. 11 is a flowchart of a wireless packet communication method according to the eighth embodiment of the present invention. This embodiment has a feature that simultaneous transmission using multiple wireless channels as described in the second embodiment or simultaneous transmission using MIMO as described in the sixth embodiment is selected in accordance with the number of pieces of data stored in the transmission buffer or the number of MIMOs described in the seventh embodiment that depends on a channel condition (S7). In accordance with this selection, reconstruction of wireless packets is performed in such a manner that reconstructed wireless packets have the same packet time length for the number of idle channels or the Number of MIMOs. The reconstructed wireless packets are transmitted simultaneously (S4 and S8). Except for the above, this embodiment is the same as the second embodiment.

[Exemplary Structure of a Wireless Packet Communication Apparatus]

Figure 12:
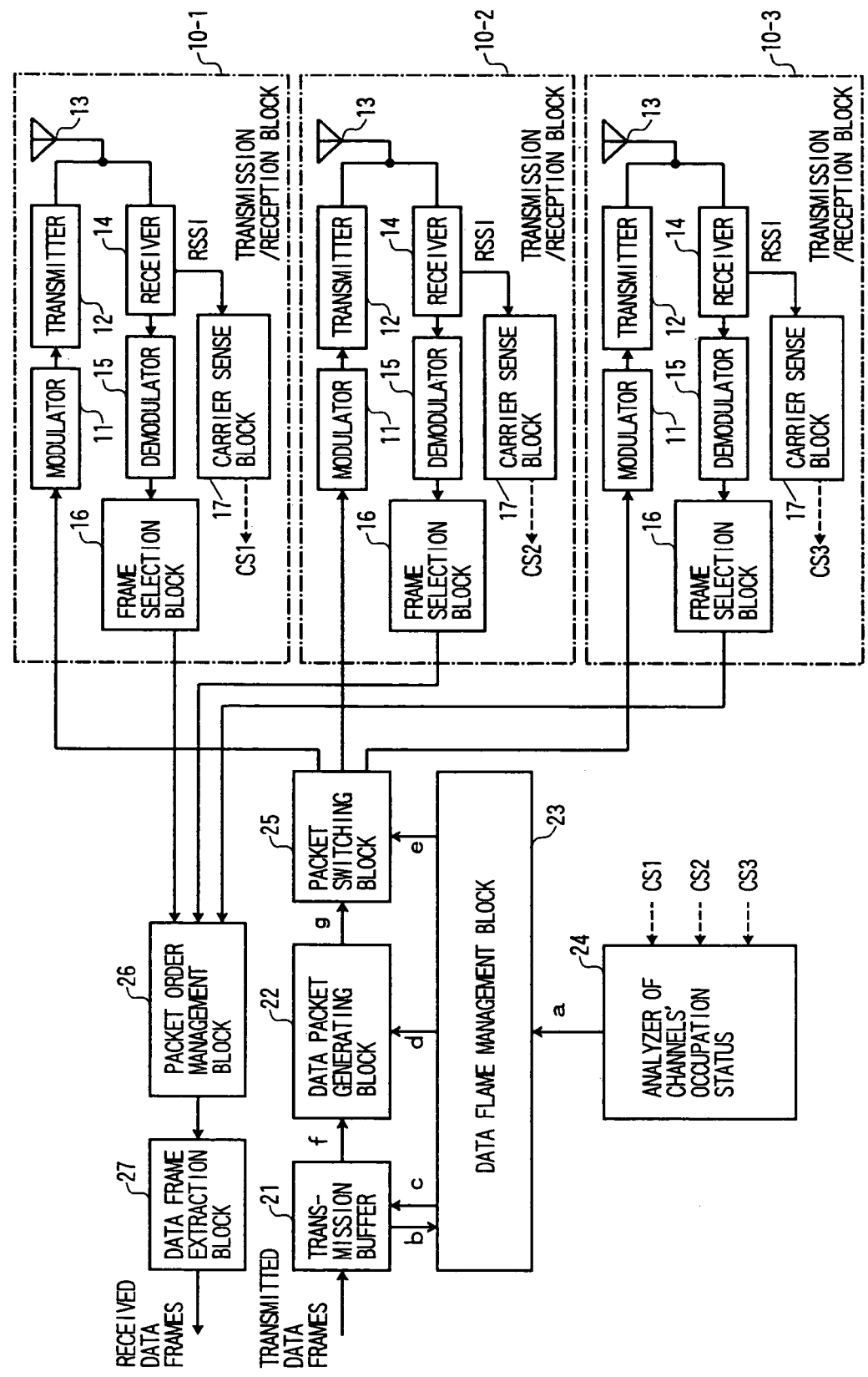
FIG. 12 is a block diagram of an exemplary wireless packet communication apparatus according to the present invention.
Figure 13:
FIG. 13 explains exemplary methods for transmitting a plurality of wireless packets simultaneously by using multiple wireless channels.
Figure 13:
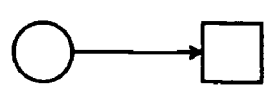
Figure 13:
Figure 13:
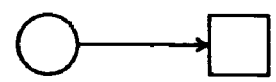
Figure 13:
Figure 14:
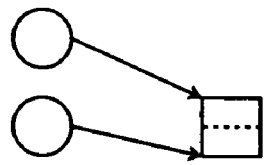
FIG. 14 explains exemplary methods for transmitting a plurality of wireless packets simultaneously by using multiple wireless channels (and MIMO).
Figure 14:
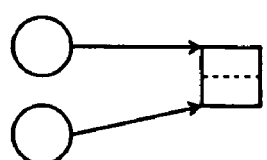
Figure 14:
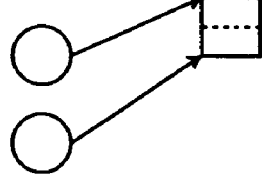
Figure 14:
Figure 14:
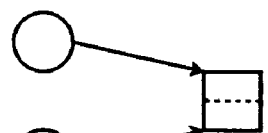
Figure 14:
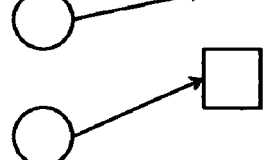
Figure 14:
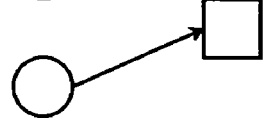
Figure 14:
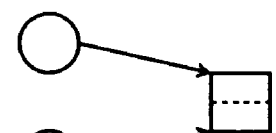
Figure 14:
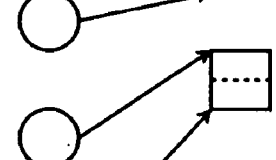
Figure 14:
Figure 15:
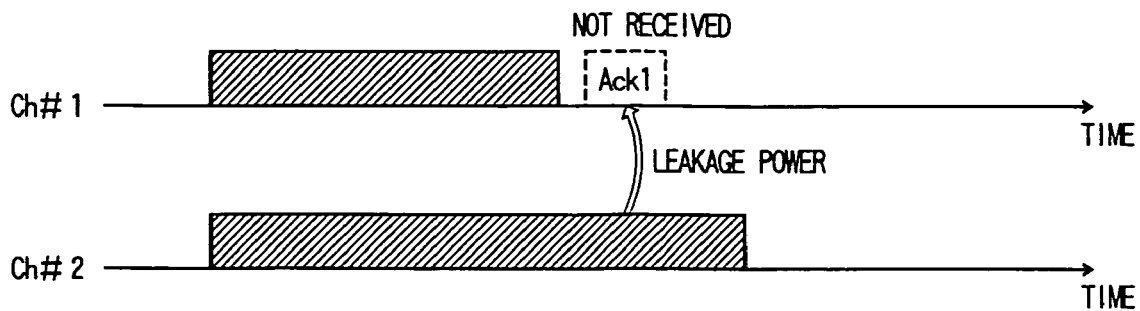
FIG. 15 explains an effect of leakage power of a wireless channel.
Figure 16:
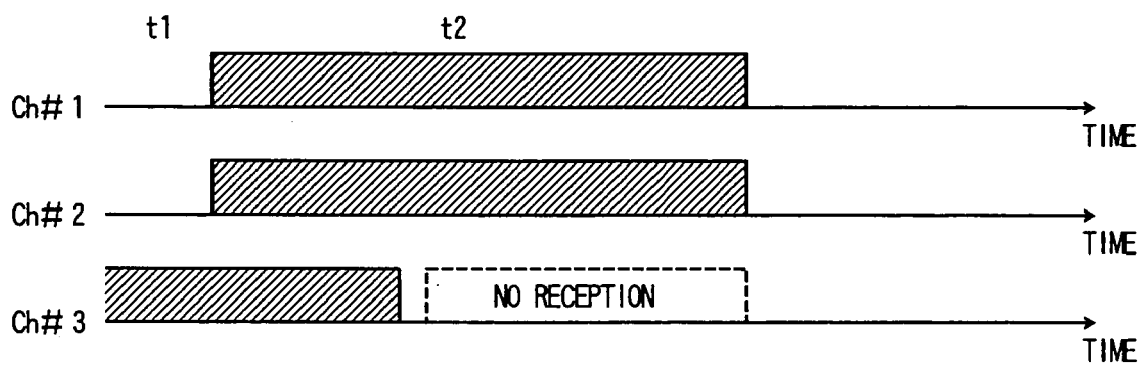
FIG. 16 explains a case where the effect of leakage power becomes a problem even if packet time lengths of wireless packets transmitted simultaneously are made the same.

FIG. 12 shows an exemplary structure of a wireless packet communication apparatus of the present invention. Although the following description will be directed to the structure of the wireless packet communication apparatus capable of transmitting and receiving three wireless packets simultaneously by using three wireless channels #1, #2, and #3, the number of simultaneously transmittable/receivable wireless packets may be set arbitrarily. Where MIMO is used for each wireless channel, wireless packets can be transmitted and received simultaneously in the number of simultaneous transmissions that is equal to the sum of MIMO numbers of multiple wireless channels. However, the MIMO will not be taken into consideration in the following description as well as a case where multiple wireless channels are independently used.

In FIG. 12, the wireless packet communication apparatus includes a transmission/reception block 10-1, 10-2, and 10-3, a transmission buffer 21, a data packet generating block 22, a data frame management block 23, an analyzer of channels' occupation status 24, a packet switching block 25, a packet order management block 26, and a data frame extraction block 27.

The transmission/reception blocks 10-1, 10-2, and 10-3 perform wireless communication via different wireless channels #1, #2, and #3, respectively. These wireless channels are independent of each other because they have different wireless frequencies from each other, therefore, the blocks can perform wireless communication using multiple wireless channels at the same time. Each transmission/reception block 10 includes a modulator 11, a transmitter 12, an antenna 13, a receiver 14, a demodulator 15, a frame selection block 16, and a carrier sense block 17.

Radio frequency signals transmitted from another wireless packet communication apparatus via different wireless channels #1, #2, and #3 are input to the receivers 14 through the antennas 13 of the transmission/reception block 10-1, 10-2, and 10-3, respectively. Each receiver 14 corresponding to each wireless channel performs a reception processing on the input radio frequency signal. The reception processing contains frequency conversion, filtering, quadrature detection, and AD conversion. A radio frequency signal on a wireless propagation path of each wireless channel is always input to the corresponding receiver 14 except during periods the antenna 13 connected to the receiver 14 is used for transmission. The receiver 14 outputs, to the carrier sense block 17, an RSSI signal indicating a received electric field strength of each wireless channel. When receiving a radio frequency signal on the corresponding wireless channel, the receiver 14 outputs to the demodulator 15 a baseband signal for which the reception processing is performed.

The demodulator 15 performs a demodulation processing on the baseband signal input from the receiver 14, and outputs a resulting data packet to the frame selection block 16. The frame selection block 16 performs CRC check on the input data packet. In the case where the data packet has been received correctly, the frame selection block 16 determines whether or not the data packet is directed to an own STA. More specifically, the frame selection block 16 determines whether or not a receive-side STA ID of the data packet is coincident with ID of the own STA. Then, the frame selection block 16 outputs the data packet addressed to the own STA to the packet order management block 26 while transmitting to the modulator 11 an ACK packet generated in an ACK packet generating block (not shown) and performs a reply processing. In transmission of the ACK packet, a transmission mode may be set in such a manner that a transmission rate is set or MIMO is not applied. On the other hand, when the data packet is not directed to the own STA, the frame selection block 16 discards the data packet.

The packet order management block 26 checks sequence numbers added to received data packets and rearranges the received data packets in an appropriate order, i.e., in order of sequence numbers. The rearranged data packets are output to the data frame extraction block 27 as received data packets. The data frame extraction block 27 removes a packet header from each of the data packets contained in the received data packets, and outputs the resulting data packets as received data frames.

When receiving an RSSI signal, the carrier sense block 17 compares a value of a received electric field strength represented by the RSSI signal with a preset threshold value. When a state where the received electric field strength is smaller than the threshold value continues for a predetermined period, the carrier sense block 17 determines that the assigned wireless channel is idle. Otherwise, the carrier sense block 17 determines that the assigned wireless channel is busy. The carrier sense blocks 17 corresponding to the respective wireless channels output the determination results as carrier sense results CS1 to CS3. Please note that in each transmission/reception block 10, no RSSI signal is input to the carrier sense block 17 while the antenna 13 is in transmission. Moreover, in the case where the antenna 13 has already been in a transmission state, it is not possible to simultaneously transmit another data packet as a radio frequency signal by means of the same antenna 13. Therefore, when receiving the RSSI signal, each carrier sense block 17 outputs the carrier sense result indicating that the wireless channel assigned thereto is busy.

The carrier sense results CS1 to CS3 that are output from the carrier sense blocks 17 corresponding to the respective wireless channels are input to the analyzer of channels' occupation status 24. The analyzer of channels' occupation status 24 manages an idle status of each wireless channel based on the corresponding carrier sense result and notifies the data frame management block 23 of information on an idle wireless channel, the number of idle channels, and the like (FIG. 12,$a$).

On the other hand, sent data frames to be transmitted are input to and buffered in the transmission buffer 21. The sent data frames consists one or more data frames. The transmission buffer 21 successively notifies the data frame management block 23 of the number of data frames the transmission buffer 21 currently stores, ID information of a receive-side wireless packet communication apparatus, a data size, address information indicating a position in the buffer, and other information (b).

The data frame management block 23 determines how to generate data packets from which data frame and on which wireless channel to transmit, according to information about data frames for each receive-side STA ID from the transmission buffer 21 and information about the wireless channels from the analyzer of channels' occupation status 24. The data frame management block 23 then notifies the transmission buffer 21, the data packet generating block 22, and the data packet switching block 25 of the determined data frame, generation manner, and wireless channel, respectively (c, d, and e). For example, in the case where the number N of idle wireless channels including the mandatory channel is smaller than the number K of transmission stand-by data frames in the transmission buffer 21, the number N of idle wireless channels including the mandatory channel is determined as the number of data packets transmitted simultaneously. The transmission buffer 21 is notified of address information to designate N data frames from the K data frames (c). The data packet generating block 22 is notified of information necessary for generating N data packets from data frames input from the transmission buffer 21 (d). The packet switching block 25 is instructed to associate the N data packets generated by the data packet generating block 22 with the idle wireless channels (e).

Figure 17:
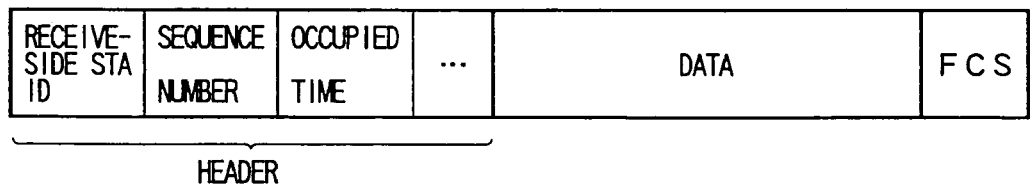
FIG. 17 shows a structure of a wireless packet used in the wireless packet communication apparatus of the present invention.

According to an output instruction, the transmission buffer 21 outputs the data frames to the data packet generating block 22 (f). The data packet generating block 22 extracts data fields from the respective data frames to generate a plurality of data blocks having the same packet time length, and adds a packet header and a CRC code (FCS region) to each of the data blocks to generate data packets shown in FIG. 17. The packet header contains ID information on a receive-side STA as a destination of the corresponding data packet, control information such as a sequence number indicating an order of the data frame, and other information. The control information also contains information required for a receive-side STA to convert a data packet into the original data frame when it receives the data packet. The packet switching block 25 associates the data packets input from the data packet generating block 22 with the respective wireless channels.

As a result, the data packet associated with the wireless channel #1 is input to the modulator 11 in the transmission/reception block 10-1; the data packet associated with the wireless channel #2 is input to the modulator 11 in the transmission/reception block 10-2; and the data packet associated with the wireless channel #3 is input to the modulator 11 in the transmission/reception block 10-3. When receiving a data packet from the packet switching block 25, each modulator 11 performs a predetermined modulation processing on the data packet and outputs the processed data packet to the transmitter 12. Each transmitter 12 performs a transmission processing on the modulated data packet input from the modulator 11. The transmission processing contains DA conversion, frequency conversion, filtering, and power amplification. After the transmission processing, each transmitter 12 transmits the processed data packet as a wireless packet on the corresponding wireless channel via the corresponding antenna 13.

The processings described in the first to eight embodiments are performed under a control of the data frame management block 23 with the mandatory channel taken into consideration. This can prevent a situation that a wireless packet cannot be received by use of multiple wireless channels because of leakage of power from one channel to an adjacent channel.

The invention is not limited to the above embodiments and various modifications may be made without departing from the spirit and scope of the invention. Any improvement may be made in part or all of the components.

INDUSTRIAL AVAILABILITY

According to the present invention, while a transmit-side STA is in transmission using one or more wireless channels including a mandatory channel, the other STAs do not perform transmission to the transmit-side STA. Thus, it is possible to avoid a situation that the transmit-side STA cannot receive a wireless packet addressed to an own STA. On the other hand, the other STAs can surely transfer a wireless packet to the transmit-side STA by transmitting the wireless packet after the mandatory channel becomes idle. Thus, throughput can be improved.

Moreover, in the case where there is an STA for which no mandatory channel is set, transmission is enabled between STAs including the STA even when the mandatory channel is busy. Thus, reduction of the throughput can be suppressed.

The invention claimed is:

1. A wireless packet communication method for transmitting a plurality of wireless packets simultaneously by using multiple wireless channels determined to be idle by carrier sense, a single wireless channel determined to be idle and MIMO, or the multiple wireless channels and the MIMO, the method comprising:

setting a mandatory channel that is always used for transmission; and transmitting the wireless packets by using a wireless channel/wireless channels that includes/include the mandatory channel, only when the mandatory channel is idle.

2. A wireless packet communication method for transmitting a plurality of wireless packets simultaneously by using multiple wireless channels determined to be idle by carrier sense, a single wireless channel determined to be idle and MIMO, or the multiple wireless channels and the MIMO, the method comprising:

distinguishing an STA A from an STA B, the STA A for which a mandatory channel is set, the STA B for which no mandatory channel is set, the mandatory channel being always used for transmission; and when wireless packets are addressed to said STA A, transmitting the wireless packets to said STA A by using a wireless channel/wireless channels that includes/include the mandatory channel, only when the mandatory channel is idle; and when wireless packets are addressed to said STA B, transmitting the wireless packets to said STA B by using idle wireless channel(s).

3. The wireless packet communication method according to claim 1 or 2, wherein the plurality of wireless packets transmitted simultaneously are set to have a same or equivalent packet time length that corresponds to a packet size or a transmission time.

4. The wireless packet communication method according to claim 1 or 2, further comprising simultaneously transmitting wireless packets selectively using the multiple wireless channels or the MIMO in accordance with a number of pieces of data or a number of MIMOs that depends on a channel condition.

5. A wireless packet communication apparatus for transmitting a plurality of wireless packets simultaneously by using multiple wireless channels determined to be idle by carrier sense, a single wireless channel determined to be idle and MIMO, or the multiple wireless channels and the MIMO, the apparatus comprising a unit setting a mandatory channel that is always used for transmission, and transmitting the wireless packets only when the mandatory channel is idle by using a wireless channel or wireless channels that includes/include the mandatory channel.

6. A wireless packet communication apparatus for transmitting a plurality of wireless packets simultaneously by using multiple wireless channels determined to be idle by carrier sense, a single wireless channel determined to be idle and MIMO, or the multiple wireless channels and the MIMO, the apparatus comprising
    a unit distinguishing an STA A from an STA B and determining destinations of the wireless packets so as to transmit wireless packets addressed to said STA A only when said mandatory channel is idle by using a wireless channel or wireless channels that includes/include a mandatory channel, and to transmit wireless packets addressed to said STA B by using idle wireless channel or channels, the mandatory channel being always used for transmission, the STA A for which the mandatory channel is set, the STA B for which no mandatory channel is set.

7. The wireless packet communication apparatus according to claim 5 or 6, wherein
    the plurality of wireless packets transmitted simultaneously are set to have a same or equivalent packet time length that corresponds to a packet size or a transmission time.

8. The wireless packet communication apparatus according to claim 5 or 6, further comprising:
    a unit simultaneously transmitting wireless packets selectively using the multiple wireless channels or the MIMO in accordance with a number of pieces of data or a number of MIMOs that depends on a channel condition.

* * * * *